United States Patent [19]

Jiewertz

[11] 4,381,662
[45] May 3, 1983

[54] METHOD AND DEVICE FOR REGULATING THE SIGNAL LEVEL FROM A TRANSDUCER CONNECTED TO AN INTERNAL COMBUSTION ENGINE

[75] Inventor: Sten R. Jiewertz, Järna, Sweden
[73] Assignee: Saab-Scania Aktiebolag, Sweden
[21] Appl. No.: 231,751
[22] Filed: Feb. 5, 1981

[30] Foreign Application Priority Data

Feb. 11, 1980 [SE] Sweden .................. 8001072

[51] Int. Cl.³ .................................... G01L 23/22
[52] U.S. Cl. .................................... 73/35; 123/435
[58] Field of Search ............... 73/35; 123/425, 435

[56] References Cited

U.S. PATENT DOCUMENTS 4,289,102 9/1981 Katsumata et al. .............. 123/425
4,290,398 9/1981 Hattori et al. .................. 123/425

Primary Examiner—James J. Gill
Attorney, Agent, or Firm—Ostrolenk, Faber, Gerb & Soffen

[57] ABSTRACT

A method and an arrangement for regulating the signal level in detecting knocking in an internal combustion engine. A transducer, incorporated in a knocking detector, senses a parameter responding to pressure and/or temperature during combustion in the engine and emits a signal representing the degree of knocking. The output signal of the knocking detector controls a knocking-regulating quantity affecting combustion in the engine by being applied to a signal level limiting block which, when knocking sensed by the transducer exceeds a preselected level, limits the output signal level to a level corresponding to said preselected level, whereafter the output signal, at least for a limited time, can only be altered by signals representing a lesser degree of knocking than the preselected degree. Knocking can then be inhibited without delay.

9 Claims, 3 Drawing Figures

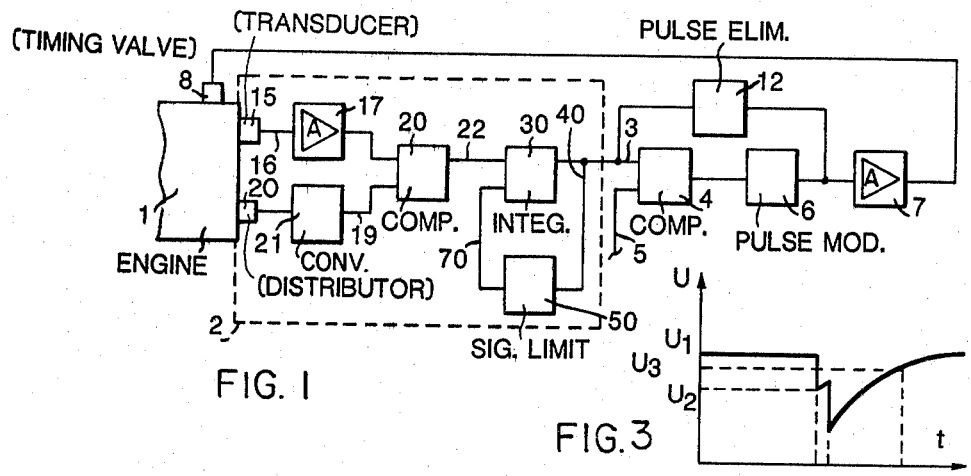
FIG. 1
FIG. 3
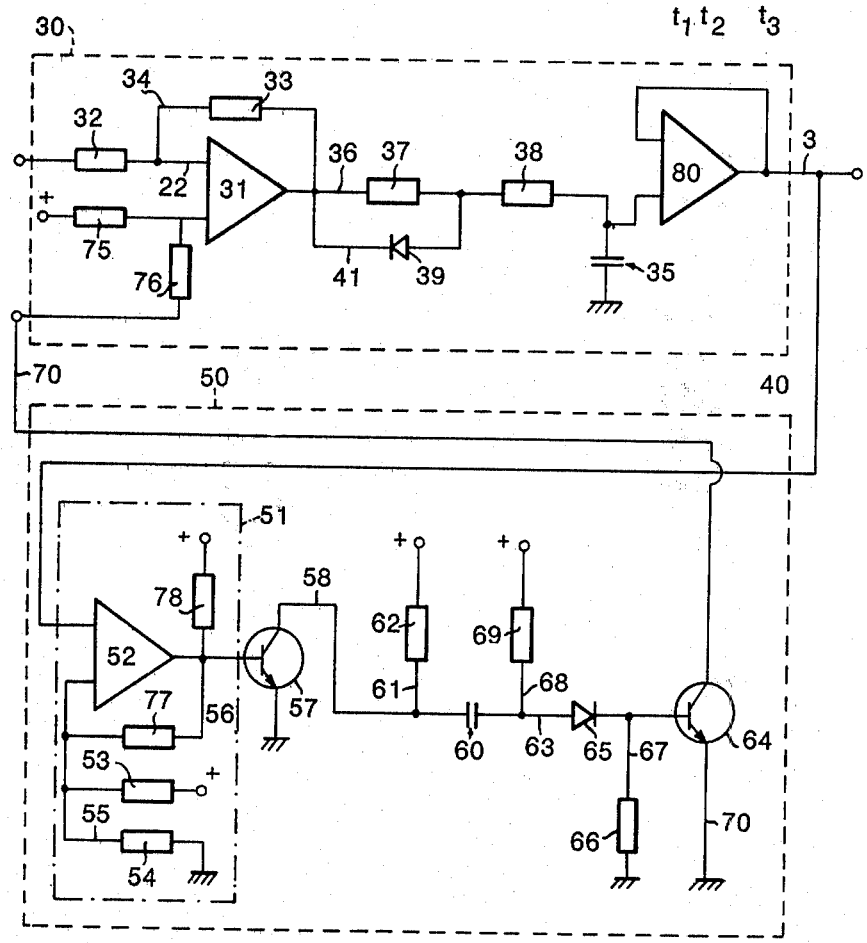
FIG. 2

METHOD AND DEVICE FOR REGULATING THE SIGNAL LEVEL FROM A TRANSDUCER CONNECTED TO AN INTERNAL COMBUSTION ENGINE

The present invention relates to a method of regulating the signal level in the detection of abnormal combustion processes, so-called knocking, in an internal combustion engine, and a device for carrying out said method. In accordance with the invention, a transducer or the like, associated with a knock detector, is connected to the engine and adapted for sensing a parameter which is affected by the pressure and/or temperature conditions prevailing during combustion in the engine, and for giving in response thereto an output signal representing the degree of knocking occurring in the engine, said output signal being taken to an electronic unit for regulating the combustion process in the engine.

In Otto engines it is known that so-called knocking can occur during certain operational conditions, especially when an engine is heavily loaded. By knocking is intended an explosive and uncontrolled combustion in the cylinders of an engine, which is induced by inducted fuel-air mixture being ignited locally in the combustion chamber before a flame front, propagated from the spark plug, has catered for ignition. The engine is then subjected to high pressure and temperature stresses, which can lead to mechanical engine damage.

In Otto engines it is known to avoid abnormal combustion processes by using a so-called knock detector. This can be adapted for sensing the engine ignition setting and/or induction pressure and in response thereto give an output signal for the purpose of inhibiting any knocking which is in progress. Irrespective of what quantity, i.e. property or phenomenon, which is selected for such regulation, it is desirable that the knock detector csuses an alteration of the quantity, which is well-adjusted in respect of time and magnitude, since the alteration can adversely affect the engine fuel economy and/or performance.

The present invention has the object of defining a method which facilitates the knock detector's control of the quantity regulating combustion in the engine. In this respect the invention is distinguished in that the transducer's output signal is applied to a signal level limiting means which, when knocking sensed by the transducer exceeds a preselected level, limits the output signal level to a level corresponding to said preselected level, and that for at least a limited time the output signal can only be altered by signals representing a lower level of knocking in the engine than the preselected level.

The inventive method signifies that sensed knocking above a level corresponding to the signal limiting cannot cause an effect on the knocking-inhibiting quantity corresponding to the true degree of knocking. Instead, said effect on the quantity is restricted so that it conforms to a value corresponding to the preselected signal level.

During exhaustive studies of internal combustion engines controlled by a knock detector it has been found that the great majority (95 percent) of the number of knocking conditions sensed during normal operation it is sufficient only to create a limited effect on the knocking-inhibiting quantities to obtain sure inhibition of the knocking condition. An explanation of this is that the knocking condition can be regarded as formed by a plurality of individual knocks immediately following each other, i.e. pressure oscillations of which the first knock is usually considerably larger than the subsequent knocks. Regulating the quantity influencing knocking in direct proportion to the strength of the first knock would consequently result in too heavy an alteration of the combustion process in the engine in most cases. It would furthermore take longer time for a normal combustion condition to occur once again in the engine. By the inventive limited regulation of the knock-inhibiting quantities and the restricted time during which said quantities are affected, there is achieved for the engine both increased performance and improved fuel economy.

In a preferred embodiment of the invention, an output signal representing knocking above a preselected level is allowed to assume a value proportional to the sensed vibration level only after a preselected, restricted period of time has passed. In the cases where the knocking conditions cannot be inhibited during the preselected period of time, the knock detector triggers an output signal, the level of which is proportional to the knocking strength. The inhibition of also such knocking conditions within reasonable time is thus ensured.

An arrangement for carrying out the method described in the introduction to the description is substantially distinguished in that the transducer is connected to a signal level limiting block incorporated in the electronic unit, said block comprising a detector sensing the signal level and comparing the instant output signal level from the transducer with a preselected signal level representing a threshold value, and a time circuit which in response to said comparison regulates the period of time during which the signal level limiting block will affect the output signal of the transducer.

Further features distinguishing the invention are apparent from the following description of an embodiment exemplifying the invention and the following patent claims. The description will now be carried out with reference to the appended drawing, where FIG. 1 is a block diagram of an inventive arrangement for detecting and regulating abnormal combustion processes in an internal combustion engine, FIG. 2 is a circuit diagram for an advantageous embodiment of an integrator and a signal level limiting block illustrated in FIG. 1, and FIG. 3 is a graph illustrating the inventive signal limiting.

In FIG. 1 there is partially illustrated an Otto engine 1, to which there is connected a so-called knock detector 2 for detecting knocking occurring in the engine. The output signal of the knock detector 2 is applied via a wire 3 to a comparator 4 for comparison with a reference signal applied to the comparator via a wire 5 and representing a quantity regulating knocking, e.g. the induction pressure of fuel fed into the engine combustion chamber. The output signal from said comparator 4 is formed by the difference between the signals applied to it and has a level which can be considered as corresponding to the alteration to which the knocking-regulating quantity should be subjected if the knocking sensed in the engine is to be inhibited. Said output signal is applied to a pulse modulator 6, in which the signal is converted to a pulse train with constant frequency, but where the relation between the positive and negative portions of the period are in response to the output signal level from the comparator 4. The pulse train from the modulator 6 is amplified in an amplifier 7, which constitutes the driving step for a so-called timing valve 8. This valve functions in principle as a solenoid valve to open and close in time with the variations between the positive and the negative period portions of the pulse train, to control directly or indirectly the knocking-regulating quantity for affecting combustion in the engine 1.

The output signal of the knock detector 2 is also applied to a pulse eliminator 12 via the wire 3, said eliminator being connected in parallel with the comparator 4 and the pulse modulator 6. The output signal from the pulse eliminator 12 affects the output signal of the pulse modulator 6 before this signal is applied to the amplifier 7 and the timing valve 8. The task of the pulse eliminator 12 is to produce, when output signals from the knock detector 2 represent knocking above a preselected level, an output signal eliminating pulsing of the output signal from the pulse modulator 6 for a similarly preselected period of time. The knocking-inhibiting quantity is thus affected in the heaviest and most rapid way possible with the object of inhibiting the knocking sensed in the engine 1 as rapidly as possible.

A transducer 15 in the form of a so-called accelerometer of a kind known per se is incorporated in the knock detector 2. The transducer 15 normally senses the vibrations in the engine walls piezoelectrically, these vibrations being directly traceable to the pressure conditions prevailing in the engine 1 during combustion. The transducer 15 thereby gives an output signal, the level of which is in direct proportion to said pressure conditions. This output signal is applied via a wire 16 to an amplifier circuit 17, and after amplification it is taken to a comparator 18.

A reference signal is also applied to the comparator 18 via a wire 19. The reference signal is obtained from a pulse train generated by an ignition distributor 20 conventionally adapted at the engine, the frequency of the pulse train corresponding directly to the engine r.p.m. The pulse train is taken to a converter 21 in which it is converted to an output signal with a voltage varying in response to the frequency of the pulse train. The signal level applied to the comparator 18 is thus proportional to the engine r.p.m., but also serves as a reference level for the pressure conditions which should prevail during combustion in an Otto engine operating optimally.

The comparison made in the comparator 18 between the signal level representing true pressure conditions in the engine and the signal level representing the criterion value for said pressure conditions results in an output signal, the level of which represents the difference between said signal levels. This output signal is applied to an integrator 30 via a wire 22, and the signal level obtained in the integrator 30 constitutes the output signal level of the latter to the wire 3.

The output signal of the integrator 30 is taken via a wire 40 to a signal level limiting block 50, the output signal of which via a wire 70 is fed back to the integrator 30 for adjustment and possible signal level limiting of the output signal of the knock detector 2.

The circuit diagram of an advantageous embodiment of the analogue integrator 30 and the signal level limiting block 50 is illustrated in FIG. 2. The integrator 30 includes an operation amplifier 31, on the negative input of which the output signal from the comparator 18 is applied via the wire 22 and a resistor 32 inserted therein. A resistor 33 is inserted into a branch wire 34 connecting the output of the amplifier 31 with the negative input of the amplifier, and the ratio between said resistors 32,33 decides the amplification in the amplifier 31. There is usually a fixed voltage prevailing on the positive input to the amplifier 31, athough this voltage can be affected by the output signal of the signal level limiting block 50 in a manner which will be seen from the following description.

The output signal from the amplifier 31 assumes a high level if the voltage on the input wire 22 upsteam of the resistor 32 is low, which is the case when there is no knocking. On the other hand, if knocking is sensed by the transducer 15 (FIG. 1), the comparator 18 gives a high output signal level resulting in that the voltage on the wire 22 assumes a high level corresponding to the knocking, which in turn results in a corresponding low signal level on the output of the amplifier 31.

A high output signal level from the amplifier 31 enables a capacitor 35 connected to the output wire 36 from the amplifier to become charged or to be kept charged. Two resistors are inserted in the wire 36, a high value resistor 37 and a low value resistor 38. The pole of the capacitor 35 not connected to the wire 36 is connected to earth. The resistors 37,38 decide the charging rate of the capacitor 35, and via an operation amplifier 80 connected as a voltage follower, the voltage of the capacitor 35 represents the output signal of the integrator 30 on the wire 3.

A low output signal level from the amplifier 31, corresponding to a given degree of knocking in the engine 1, results in that the capacitor 35 is discharged through the amplifier 31 via the low value resistor 38 and via a wire 41 provided with a diode 39, said wire 41 being coupled in parallel with the high value resistor 37. The result of this is that during discharge, the diode 39 is protected from current pulses by the resistor 38. The output signal from the integrator 30 conforms with that of the capacitor 35, in this case signifying that a dropping voltage can be regarded as representing knocking present in the engine.

The signal on the output of the integrator 30 also constitutes the input signal, via the wire 40, to the signal level limiting block 50. The latter includes a signal level detector 51, sensing the input signal level and determining a limiting level for the output signal of the integrator 30, said limiting level representing maximum knocking level.

The signal level detector 51 comprises an operation amplifier 52 connected as a comparator, on the negative input of which is applied the output signal from the integrator 30. A fixed voltage is applied to the positive input of the comparator 52, the value of this voltage being determined by two resistors 53 and 54 in a wire 55 between a voltage source and earth. As long as the output signal level of the integrator 30 exceeds the voltage level on the positive input of the comparator 52, the output signal level of the comparator 52 will also have a low value. This output signal is applied to the base of a transistor 57 via a wire 56, said transistor thereby blocking connection to earth for a capacitor 60 via a wire 58. As a result of the blocked earth connection, the capacitor 60 is given a high voltage by charging from a voltage source via a wire 61 provided with a resistor 62.

In a charged condition, the negative pole of the capacitor 60 also has a comparatively high voltage. Said pole is connected to a wire 63 connecting the capacitor 60 with the base of a transistor 64. For a charged state of the capacitor 60, a relatively high voltage is applied to the base of the transistor 64, and the collector-emitter connection of the transistor 64 will thus be conductive, enabling earth connection via the wire 10. The wire 70 is in communication with a voltage source via two resistors 75 and 76 at the input of the integrator 30. The voltage level between said resistors 75,76 is applied to the positive input of the amplifier 31.

When the transistor 64 is conductive, the previously-mentioned fixed voltage having a relatively low level is applied to the positive input of the amplifier 31. The result of this is that the output of the amplifier 31 obtains a high voltage level as long as a low level is maintained on the wire 22, which is the case as long as knocking is not sensed in the engine.

Knocking occuring in the engine results in that the voltage level on the negative input of the comparator 52 falls below the level on the positive input, a high output signal level thus being obtained on the output of the comparator 52. This results in that the transistor 57 becomes conductive, so that the capacitor 60 obtains communication with earth via the wire 58. The negative pole of the capacitor 60 thus obtains a large negative voltage level, which cannot reach the transistor 64 because of a diode 65 arranged in the wire 63. The base of the transistor 64 assumes a low voltage level as a result of an earth connection via a wire 67 with an inserted resistor 66. The low voltage level at the base of the transistor 64 causes the transistor to block earth connection via the wire 70, whereby the positive input of the amplifier 31 can assume a relatively high voltage level. This also causes a high output signal level from the amplifier 31, independent of the signal level representing knocking. Charging of the capacitor 35 is consequently initiated, and thereby an increase of the output signal level of the knock detector 2.

Said increase in level continues until the negative pole of the capacitor 60 of the signal level limiting block 50 has obtained sufficient charge via the wire 68 to make the transistor 64 conduct again, thereby lowering the voltage level on the positive input of the amplifier 31. If there is now a high signal level representing a high degree of knocking, on the wire 22, the output signal of the amplifier 31 can once again cause a lowering of the level of the output signal of the knock detector 2. Said signal does not however result in any renewed change of the output signal of the signal level detector 51, since the resistors 77,78 are connected as a so-called hysteresis circuit, and this results in that the voltage on the positive input of the comparator 52 assumes a higher level.

Said level is selected such that the output signal of the integrator 30 cannot attain the threshold level in question during the time preselected in the signal level limiting block 50 and determined by the relationship between the value of the resistor 62 and the value of the capacitor 60. Should the output signal of the integrator 30 still assume a value representing a high degree of knocking after the preselected time, the signal level detector 51 will not be in a condition to detect this and the level of said signal is thereby not limited. The output signal of the compartor 52 is first reset to a low level when the output signal level of the integrator 30 reaches, during inhibition of the knocking condition, the level prevailing on the positive input of the comparator 52. The positive input of the comparator 52 thereby also obtains a reduced voltage level, which enables the signal level detector 51, and thus also the signal level limiting block 50, to carry out renewed modification of the output signal of the integrator 30.

The function of the embodiment illustrated in FIG. 2 can be described according to the following while referring to FIG. 3. In sensing the knocking present in the engine, the output signal level of the integrator 30 sinks from a voltage level $U_1$, representing no knocking, to a voltage level $U_2$, which alters the output signal from the signal level detector 51 so that the signal level limiting block 50 begins raising the output signal level of the integrator 30, which occurs during a preselected period of time $t_1$ to $t_2$. After said period of time, which is determined by the time circuit 60,69 incorporated in the signal level limiting block 50, the output signal of the integrator 30 is once again modifiable by an input signal on the wire 22, representing knocking. In the example illustrated in FIG. 3, there is a heavy knocking signal to the integrator 30 at the time $t_2$ also, the output signal for the integrator then sinking to a level corresponding to the degree of knocking in question. Possible knocking signals to the integrator 30 can subsequently not affect the output signals of the integrator 30, since modifications of the knocking-regulating quantity which have already been made begin to take effect. This signifies that the curve begins to rise towards the original level $U_1$, and that at time $t_3$ it passes the level where the signal level detector 51 can once again come into action for limiting the output signal level of the integrator 30. It is advantageous to limit the output level of the transducer to level $U_2$, which is less than 50% of the output signal that would be obtained from the transducer under conditions of maximum knocking in the absence of signal limiting.

With the described solution, the type of knocking process dominating in normal operation of a vehicle engine can thus be quickly inhibited and with less loss of performance and fuel economy than if knocking were to be inhibited without the inventive signal level limiting. At the same time it is ensured that unusually heavy knocking processes result in a correspondingly heavy modification of the quantity selected to inhibit knocking.

The embodiment described above must not be considered as limiting the invention, since the invention can be modified into a plurality of embodiments within the scope of the following patent claims.

What I claim is:

1. A method of regulating the signal level in detect of abnormal combustion processes, so-called knocking, in an internal combustion engine, said method comprising the steps of:

sensing a parameter having a predetermined relationship to conditions prevailing in an engine during combustion therein, generating a signal representing said parameter, and using the level of said signal as a measure of the level of knocking occuring in the engine;

comparing the level of said signal to a preselected signal level representing a preselected level of knocking;

when the knocking exceeds that level required to drive the level of said signal beyond said preselected level, limiting the level of said signal to a level corresponding to said preselected signal level during a preselected period of time; and after said preselected period of time, allowing said signal to assume a level proportional to the actual knocking level.

2. A method as claimed in claim 1, in which the level of said signal is limited during a period of time that is longer than the period of time during which heavy knocking occurs.

3. A method as claimed in claim 1, in which the preselected signal level represents less than fifty percent of the signal level corresponding to maximum knocking.

4. A method as claimed in claim 3, in which the level of said signal is limited during a period of time that is longer than the period of time during which heavy knocking occurs.

5. An arrangement for regulating the signal level in detection of abnormal combustion processes, so-called knocking, in an internal combustion engine, at least one transducer, incorporated in a knocking detector, being connected to the engine and adapted for sensing a parameter which is affected by the pressure and/or temperature conditions prevailing during combustion in the engine and for giving in response thereto an output signal representing the degree of knocking in the engine, said output signal being applied to an electronic unit for regulating the combustion process in the engine, characterized in that the transducer is connected to a signal level limiting block incorporated in the electronic unit, said block including a detector for sensing a signal level, said detector comparing the instant output signal from the transducer with a preselected signal level representing a threshold value, and a time circuit which, in response to said comparison, regulates the time during which the signal level limiting block is to affect or modify the output signal of the transducer.

6. An arrangement as claimed in claim 5, characterized in that the signal level limiting block is connected to an integrator incorporated in the knocking detector, and that the integrator output signal is applied to the detector sensing the signal level, said detector controlling the time circuit and re-applying the output signal to the integrator.

7. An arrangement as claimed in claim 6, characterized in that a comparator is incorporated in the detector sensing the signal level, the output signal level of the integrator being compared in said comparator, either with a first preselected signal level or with a second signal level representing a degree of knocking falling below a degree of knocking corresponding to the limiting level.

8. An arrangement as claimed in claim 7, characterized in that a hysteresis circuit is incorporated in the detector sensing the signal level, said circuit catering for alternation between the comparator's first and second level in response to the comparator's output signal.

9. An arrangement as claimed in claim 8, characterized in that the time circuit sends an output signal limiting the output signal of the integrator as soon as the comparator changes its output signal as a result of the signal coming from the integrator having reached said first signal level.

* * * * *